United States Patent Office 2,918,991
Patented Dec. 29, 1959

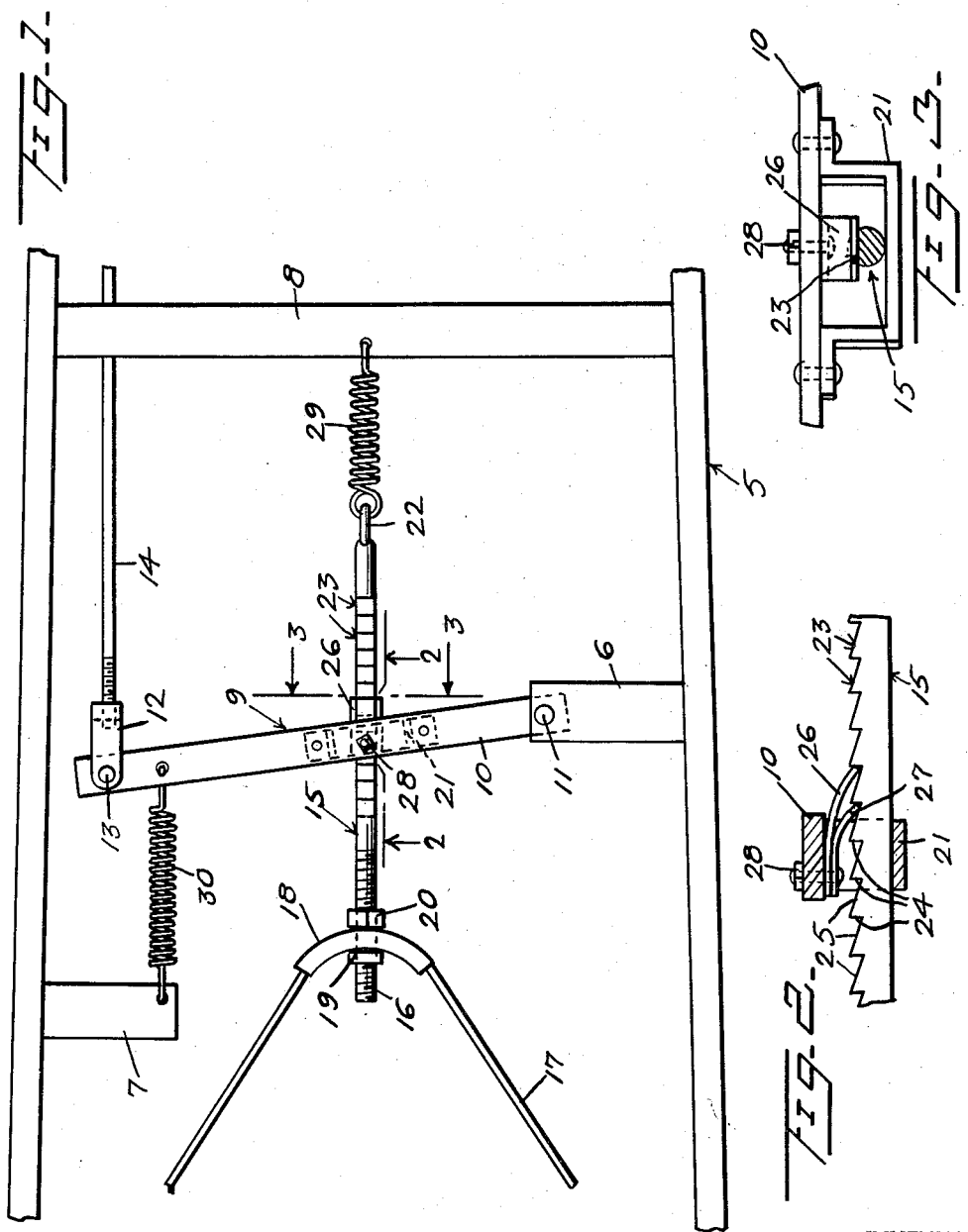

2,918,991

SELF-ADJUSTING HAND BRAKE

Norman D. Reisch, Van Nuys, Calif.

Application October 11, 1957, Serial No. 689,614

5 Claims. (Cl. 188—196)

This invention relates to a hand brake or emergency brake applying structure or linkage which is automatically adjustable to take up slack which normally occurs in such actuating units, eliminating the need for manually making such brake adjustments and to insure that the emergency or hand brake will always be in proper adjustment for maximum efficiency and operation.

More particularly, it is an aim of the present invention to provide an automatic self-adjusting emergency brake or hand brake which involves only small variations from the conventional linkage employed for applying the hand brake or emergency brake of a motor vehicle.

Various other objects and advantages of the invention will hereinafter become more fully apparent from the following description of the drawing, illustrating a presently preferred embodiment thereof, and wherein:

Figure 1 is a top plan view of a portion of a motor vehicle frame and showing the self-adjusting emergency brake actuating unit;

Figure 2 is an enlarged longitudinal sectional view, taken substantially along a plane as indicated by the line 2—2 of Figure 1, and Figure 3 is an enlarged transverse sectional view, taken substantially along a plane as indicated by the line 3—3 of Figure 1.

Referring more specifically to the drawing, an intermediate portion of a motor vehicle frame is illustrated in Figure 1 and designated generally 5 and includes transversely disposed stationary frame portions 6, 7 and 8.

The automatically self-adjusting hand brake or emergency brake actuator in its entirety is designated generally 9 and includes a lever 10 having one end connected by a pivot element 11 to the transverse frame element 6. The lever 10 extends transversely from the frame element 6 toward and to adjacent the side of the frame 5 located remote from said element 6 and from the lever pivot 11. The lever 10 is mounted to swing in substantially a horizontal plane about its pivot 11 and longitudinally of the frame 5. A clevis 12 is pivotally connected at 13 to the lever 10, adjacent the free end of said lever, and has an end of a pull rod or cable 14 adjustably connected thereto for thus connecting said pull rod or cable to the free end of the lever 10. The pull rod or cable 14 extends from the lever 10 forwardly with respect to the vehicle frame 5 across the transverse frame member 8 which is disposed forwardly with respect to said lever 10.

A pull rod 15 is connected to an intermediate portion of the lever 10 and has a threaded rear end portion 16 disposed rearwardly with respect to the lever 10, as seen in Figure 1. A cable 17 has an intermediate portion extending through and engaging in a curved or bowed member 18, and an intermediate part of member 18 engages the threaded rod end 16 between adjusting nuts 19 and 20, which are threaded on said rod end. The cable 17 projects from the rearwardly curved end portions of the member 18 and the two end portions of the cable 17 extend rearwardly in diverging relation to one another from said member 18 and have rear ends, not shown, which are adapted to be connected in a conventional manner to brake actuators of the two rear wheel brakes, not shown. The parts previously described constitute a substantially conventional hand brake or emergency brake actuating linkage, if it is assumed that the rod 15 is pivotally connected to the intermediate portion of the lever 10, and it will be aparent that a forward pull, from left to right of Figure 1, on the rod or cable 14 will cause the lever 10 to swing clockwise as seen in Figure 1 to exert a pull from left to right on the rod 15 and the ends of the cable 17 for applying the rear wheel brakes. When the pulling force is released from the rod or cable 14 the parts previously described will resume their positions of Figure 1 to release the rear wheel brakes.

The self-adjusting unit 9 differs from the conventional unit heretofore described in that the forward end of the rod 15 is not pivoted to the intermediate portion of the lever 10. Rather, the rod 15 is of a length to extend substantially past the intermediate portion of the lever 10. A yoke 21 is secured to and disposed beneath the intermediate portion of the lever 10 and an intermediate portion of the rod 15 extends through the yoke 21 and is thus supported beneath the lever 10. The rod 15 at its opposite end terminates in an eye 22 and the upper side of the rod 15, between said last mentioned end thereof and its rear threaded end 16, is provided with ratch teeth 23 having rearwardly facing upright faces 24 and forwardly facing inclined faces 25.

Corresponding ends of two spring pawls 26 and 27 are secured to the underside of the lever 10 above the rod 15 by a fastening 28. The pawls 26 and 27 are disposed transversely of the lever 10 and extend forwardly with respect to the rod 15 toward its forward end 22. The pawl 26 is longer than the pawl 27 and said pawls have downwardly curved free ends and which simultaneously engage the vertical shoulders 24 of two different ratch teeth 23, as clearly illustrated in Figure 2. The parts 23, 26 and 27 form a pawl and ratchet means permitting the lever 10 to swing in one direction relative to the rod 15 or permitting said rod 15 to slide in one direction only relative to the lever 10. It will be apparent that said pawl and ratchet means may function with either the pawl 26 or 27 omitted; however, the two pawls functioning simultaneously insure an effective operation of the self-adjusting actuating unit 9.

A tension element such as a contractile spring 29 has a forward end anchored to the forward frame element 8 and a rear end secured to the eye 22 to resist rearward displacement of the rod 15 away from said frame element 8. The tension of the spring 29 is insufficient to prevent release of the rear wheel brakes when no forward pull is being exerted on the cable or rod 14. A second tension element also comprising a contractile coiled spring 30 has a forward end secured to the lever 10, adjacent the clevis 12, and a rear end anchored to the frame member 7.

When a forward pull from left to right is applied to the rod or cable 14 to cause the lever 10 to swing clockwise as seen in Figure 1, a forward pull will be applied to the rod 15 by the lever 10 since the engagement of the pawls 26 and 27 with the ratch teeth 23 will prevent forward swinging movement of the lever 10 relative to the rod 15. Consequently, a forward pull will be exerted on the ends of the cable 17 for applying the brakes. When the forward pull is released from the rod or cable 14 said rod or cable and the lever 10 will be moved in the opposite direction and back to their positions of Figure 1 by the tension of spring 30. The right hand or forward end of the rod or cable 14, not shown, is connected in a conventional manner to a manually operated hand brake actuating member, not shown, which will prevent the spring 30 pulling the parts 10 and 14 from right to left beyond the positions of said parts, as seen in Figure 1. If no appreciable slack exists in the ends of the cable 17, the rod 15 will move rearwardly with the lever 10 against the tension of the spring 29, which is insufficient to prevent this rearward movement of the rod 15 and to overcome the pressure exerted by the pawls 26 and 27 on the rod 15 and the pull on the ends of the cable 17 in a rearward direction tending to permit the rear wheel brakes to resume released positions. However, slack gradually increases in the end portions of the cable 17, after repeated application of the hand brake. This slack increase is caused by application of the brakes and is present when the brakes are released, that is, when the parts are returned to their positions of Figure 1. Accordingly, when sufficient slack has developed, upon one return movement of the parts, when the spring 30 is urging the lever 10 counterclockwise and back to its starting position of Figure 1, the tension of spring 29 will not be sufficiently overcome by the tension of the ends of cable 17 and will be capable of retarding rearward movement of the rod 15 so that during the counter-clockwise swinging movement of the lever 10, said lever will move to some extent relative to the rod 15 and so that the free ends of the pawls 26 and 27 will move from right to left relative to the ratch teeth 23, as seen in Figure 2, so that each of the pawls will thereafter engage a ratch tooth to the left of the ratch tooth engaged thereby. In this manner the slack in the cable 17 will automatically be taken up during movement of the emergency brake actuating mechanism to a brake releasing position where sufficient slack exists to permit the pawls 26 and 27 to move with the lever 10 relative to the rod 15 a distance equal to the length of a tooth 23. It will be apparent that during such movement of the lever and pawls relative to the rod 15 that the free ends of the pawls will ride from right to left of Figure 2 over the inclined faces 25 of the teeth and will thereafter spring into engagement with the vertical faces of shoulders 24 of such teeth to automatically effect the taking up of the slack in the cable 17. The automatic self-adjusting emergency brake actuator will thus keep the emergency brake cable 17 properly adjusted and sufficiently taut so that the nuts 19 and 20 will not have to be moved from left to right of the rod portion 16 as seen in Figure 1 to effect this adjustment, as is conventional. This slack take-up will ordinarily occur during release of the hand brake since there is an inertia factor involved requiring the ends of the cable 17 to overcome the retarding force exerted by spring 29. For this reason the slack take-up will usually occur while the parts are moving from right to left toward their released positions of Figure 1, when the inertia factor favors the spring 29, rather than when the parts are in a released position and when the force of inertia would have to be overcome by spring 29 to start the rod 15 in motion from left to right. However, it is possible that the slack adjustment might be accomplished by the spring 29 moving the rod 15 from left to right while the parts are in the position as seen in Figure 1.

Various modifications and changes are contemplated and may be resorted to, without departing from the function or scope of the invention as hereinafter defined by the appended claims.

I claim as my invention:

1. In an automatic self-adjusting motor vehicle hand brake actuating mechanism, a lever, means pivotally connecting one end of said lever to a part of a vehicle frame for forward and rearward swinging movement of the lever, said lever having an opposite free end connected to a forwarding extending actuating element, a first tension element connected to said lever and anchored to a part of the frame and urging the lever to swing rearwardly of the frame, a rod having a rear end connected to an intermediate portion of a rear brake actuating cable, a second tension element having a rear end connected to the forward end of said rod and a forward end anchored to a part of the vehicle frame and disposed under tension to yieldably resist rearward movement of the rod, said rod having an intermediate portion extending across an intermediate portion of the lever, and pawl and ratchet means connecting the intermediate portion of the lever to the rod for causing said rod to move with the lever when the lever is swung forwardly and permitting said rod to move in the same direction in response to the pull of said second tension element to take up slack in the cable.

2. In an automatic brake adjuster as in claim 1, said pawl and ratchet means comprising a spring pawl carried by said lever and having a free end extending laterally from the lever toward said forward end of the rod, and ratch teeth formed in said rod and disposed to be engaged by said free end of the pawl.

3. An automatic self-adjusting actuator as in claim 2, said rod extending across the underside of the lever, said ratch teeth being disposed in the upper side of said rod, the free end of the pawl being curved downwardly to engage the ratch teeth, and a yoke carried by and supported beneath said lever and having a portion disposed beneath and supporting the rod for maintaining the ratch teeth at a proper level beneath the lever to be engaged by the pawl.

4. An automatic self-adjusting brake actuator as in claim 1, said pawl and ratchet means comprising ratch teeth formed in an intermediate portion of said rod, and a pair of spring pawls carried by the lever and extending laterally therefrom toward the forward end of the rod and having free ends disposed in spaced relation to one another and engaging different teeth of the ratch.

5. In combination with a motor vehicle emergency brake actuating mechanism including a brake actuating cable, a rod having a rear end connected to an intermediate portion of said cable, a lever swingably mounted at one end thereof on the vehicle frame for forward and rearward swinging movement and having an intermediate portion extending across an intermediate portion of said rod; a self-adjusting mechanism comprising pawl and ratchet means connecting the rod and lever for causing the rod to move with the lever when the lever is swung in a forward direction to cause the rod to exert a pull on the cable, first tension means connected to a forward end of the rod and part of the frame for resisting movement of the rod in a rearward direction, and second tension means connected to the lever and a part of the frame for causing the lever to swing in the rearward direction and relative to the rod and permitting said rod to move to take up existing slack in the cable.

References Cited in the file of this patent

UNITED STATES PATENTS

| 1,503,838 | Lovejoy | Aug. 5, 1924 |
| 1,936,530 | Taylor | Nov. 21, 1933 |
| 2,249,220 | McCann | July 15, 1941 |
| 2,588,027 | McCarthy | Mar. 4, 1952 |